Patented Oct. 4, 1938

2,131,853

UNITED STATES PATENT OFFICE 2,131,853

SUBSTITUTED HEPTA- AND PENTA-METHINECYANINES

Walter Dieterle, Dessau-Ziebigk, and Walter Zeh, Dessau, Germany, assignors to Agfa Ansco Corporation, Binghamton, N. Y., a corporation of New York No Drawing. Application September 12, 1933, Serial No. 689,122. In Germany September 14, 1932

1 Claim. (Cl. 260—240)

Our present invention relates to dyes of the polymethine series.

One of its objects are the hereinafter described dyes of the polymethine series which are valuable sensitizers for photographic emulsions. Further objects will be seen from the detailed specification following hereafter.

It is already known to sensitize silver halide emulsions by means of trimethinecyanines which are substituted in the benzene nucleus. These dyes when suitably selecting the substituents distinguish over the non-substituted dyes by an increased sensitizing power.

This invention is based on the discovery that the penta-methinecyanines and hepta-methinecyanines symmetrically disubstituted in the para-positions to the carbon atoms common to the benzene ring and the heterocyclic ring have a superior sensitizing effect on silver halide emulsions than have emulsions sensitized by penta- or hepta-methinecyanines which are not substituted or substituted only in the 5 and 5' positions or 6 and 6' positions respectively.

The dyestuffs suitable for the purpose of this invention correspond with the general formula

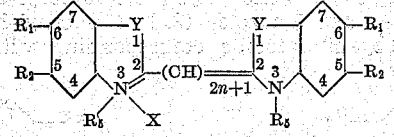

Y stands for S, Se, O, —CH=CH—, =C<R/R (R stands for alkyl or aryl).

$R_1$ and $R_2$ stand for alkyl, alkoxy, alkylthio, alkylseleno, aryl, aryloxy, $R_5$ stands for alkyl, X stands for Cl, Br, J, $SO_4CH_3$, $ClO_4$ or another suitable acid radical, $n$ stands for 2 and 3.

The hydrogen atom of the central carbon atom and/or of the lateral carbon atoms of the polymethenyl chain can be substituted by an alkyl group. Instead of two alkoxy groups for the substitution in the 5 and 6 positions, and 5' and 6' positions respectively, there may be introduced a dioxymethylene group or a dioxyethylene group; in the same manner two aryloxy groups may be replaced by a dioxyphenylene group.

The dyes are obtainable according to the desired solubility in form of the bromide, iodide, perchlorate etc. A silver halide emulsion is sensitized by incorporation of the dyes. Thus, a solution of the dye in a suitable solvent may be added to an emulsion ready for being cast, or a finished silver halide emulsion layer may be bathed in a solution of the dye.

The dyes are made according to known methods. The pentamethinecyanines are obtained by condensing the quaternary ammonium salt of a heterocyclic base disubstituted in the para positions to the carbon atoms common to the benzene ring, and the heterocyclic ring the latter containing a methyl group capable of reaction, with β-ethoxyacroleinacetal or β-ethoxyacroleinacetal substituted in α- and/or β-position. The heptamethinecyanines are prepared according to the methods disclosed by Ottmar Wahl in U. S. Patent Nos. 1,863,679 and 1,878,557 by condensing the heterocyclic bases with the salt of a pentamethenyl-dianilide or a pentamethenyl-dianilide substituted in the polymethine chain.

The bases serving as a starting material may be prepared as it has been described in the copending application Ser. No. 667,712 filed by Zeh et al.

The following examples serve to illustrate our invention.

*Example 1.*—The dye bis-[3-ethyl-5,6-dimethoxy-benzthiazole-(2)]-pentamethinecyanine iodide corresponding with the formula

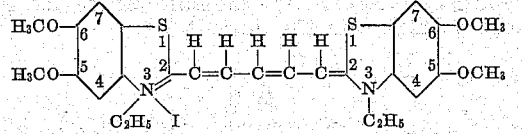

is obtainable by boiling for about ½ hour a mixture of 2 grams of 2-methyl-5,6-dimethoxy-benzothiazole ethiodide, 1 gram of β-ethoxyacroleinacetal and 5 cc. of pyridine. On the addition of 10 cc. of water the dye is precipitated from the dark green solution in form of green crystals.

The alcoholic solution of the dye has an absorption maximum at a wave length of about 685 μμ.

Incorporated in a silver bromide emulsion containing about 1 per cent of silver iodide the dye imparts to it a range of sensitivity from about $600\mu\mu$ to $830\mu\mu$ with a maximum at a wave length of about $745\mu\mu$.

*Example 2.*—The dye bis-[3-ethyl-5-ethoxy-6-methyl-benzthiazole-(2)]-pentamethine-cyanine iodide corresponding with the formula

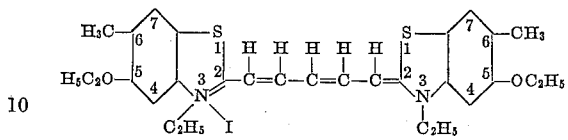

is obtained when working according to the method described in the preceding example but starting from the 2.6-dimethyl-5-ethoxybenzothiazole. The dye crystallizes from alcohol in bright green crystals.

The alcoholic solution of the dye has an absorption maximum at a wave length of about $675\mu\mu$.

Incorporated in a silver bromide emulsion containing about 4 per cent of silver iodide the dye imparts to it a range of sensitivity from about $600\mu\mu$ to $810\mu\mu$ with a maximum at a wave length of about $735\mu\mu$.

*Example 3.*—The dye bis-[3-ethyl-5.6-dimethoxy-benzthiazole-(2)]-heptamethinecyanine iodide corresponding with the formula

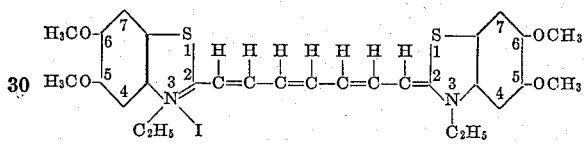

may be obtained by dissolving 2 grams of 2-methyl-5.6-dimethoxybenzothiazole ethiodide and 1 gram of $\epsilon$-phenylimido-$\alpha$-phenylamido-$\alpha.\gamma$-pentadiene-hydrobromide in 10 cc. of hot alcohol and this mixture is boiled for about 10 minutes with the addition of 0.5 cc. of diethylamin. The dye separates in form of green crystals.

Incorporated in a silver bromide emulsion containing about 4 per cent of silver iodide the dye imparts to it a range of sensitivity from about $600\mu\mu$ to $930\mu\mu$ with a maximum at a wave length of about $845\mu\mu$.

*Example 4.*—When working as described in the preceding example, but starting from the 2-methyl-5.6-diethoxybenzothiazole ethiodide, there is obtained the dye bis-[3-ethyl-5.6-diethoxy-benzthiazole-(2)]-heptamethinecyanine iodide. The dye crystallizes from methanol in green little rods.

Incorporated in a silver bromide emulsion containing about 1 per cent of silver iodide the dye imparts to it a range of sensitivity from about $660\mu\mu$ to $920\mu\mu$ with a maximum at a wave length of about $845\mu\mu$.

*Example 5.*—The dye bis-[3-ethyl-5.6-diethoxy-benzselenazole-(2)]-heptamethinecyanine iodide corresponding with the formula

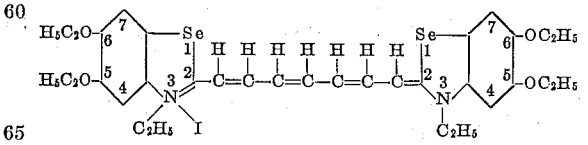

is obtained by boiling 2 grams of 2-methyl-5.6-diethoxy-benzoselenazole ethiodide in 10 cc. of alcohol with 1 gram of $\epsilon$ (n-methyl-phenylimino)-$\alpha$-(n-methyl-phenylimino)-$\alpha.\gamma$- pentadiene hydrobromide, adding 1 cc. of an alcoholic solution of trimethylamine of 50 per cent strength and continuing boiling until the dye begins to separate. The dye which has been precipitated by cooling is recrystallized from methanol and forms then blackish green little rods.

Incorporated in a silver bromide emulsion containing about 4 per cent of silver iodide the dye imparts to it a range of sensitivity from about 650 to $950\mu\mu$ with a maximum at a wave length of about $865\mu\mu$.

*Example 6.*—The dye bis-[3-ethyl-5.6-dimethoxy-benzthiazole-(2)]-$\gamma$-methyl-penta-methine-cyanine iodide corresponding with the formula

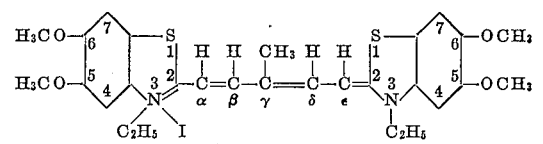

may be obtained by heating 2 grams of 2-methyl-5.6-dimethoxybenzothiazole ethiodide in 10 cc. of pyridine with 1 gram of $\beta$-ethoxy-$\alpha$-methyl-acroleinacetal for about 30 minutes to 130° C. On the addition of about 10 cc. of water the dye separates in form of bluish green flakes. The dye crystallizes from alcohol in green felted needles.

The alcoholic solution of the dye has an absorption maximum at a wave length of about $685\mu\mu$.

Incorporated in a silver bromide emulsion containing about 4 per cent of silver iodide the dye imparts to it a range of sensitivity from about $600\mu\mu$ to $830\mu\mu$ with a maximum at a wave length of about $745\mu\mu$.

*Example 7.*—The dye bis-[3-ethyl-5.6-diethoxy-benzthiazole-(2)]-$\delta$-methyl-heptamethinecyanine iodide corresponding with the formula

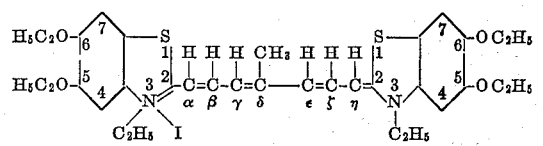

may be obtained by boiling 2 grams of 2-methyl-5.6-diethoxy-benzothiazole ethiodide with 1 gram of $\epsilon$-phenylimido-$\alpha$-phenylamido-$\gamma$-methyl-$\alpha.\gamma$-pentadiene hydrobromide until the mixture becomes green. After cooling the dye separates in form of green crystals.

Incorporated in a silver bromide emulsion containing about 4 per cent of silver iodide the dye imparts to it a range of sensitivity from about $600\mu\mu$ to $930\mu\mu$ with a maximum at a wave length of about $845\mu\mu$.

*Example 8.*—The dye bis-[3-ethyl-5.6-dimethyl-benzselenazole-(2)]-$\delta$-methyl-heptamethinecyanine iodide corresponding with the formula

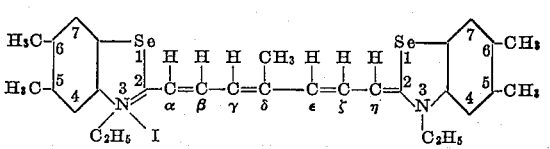

may be obtained when working according to the preceding example, but starting from the 2.5.6-trimethylbenzoselenazole ethiodide. The dye crystallizes from alcohol in light green crystals.

Incorporated in a silver bromide emulsion containing about 1 per cent of silver iodide the dye imparts to it a range of sensitivity from about $700\mu\mu$ to $910\mu\mu$ with a maximum at a wave length of about $850\mu\mu$.

What we claim is:

Bis-[3-ethyl-5.6-diethoxy-benzthiazole-(2)]-heptamethinecyanine iodide.

WALTER DIETERLE.
WALTER ZEH.